United States Patent
Kusnezow

(10) Patent No.: US 6,765,176 B2
(45) Date of Patent: Jul. 20, 2004

(54) APPARATUS FOR TREATING MATERIALS BY MEANS OF A LASER BEAM

(75) Inventor: Gennadij Kusnezow, Langenhagen (DE)

(73) Assignee: LPKF Laser & Electronics AG, Garbsen (DE)

(*) Notice: Subject to any disclaimer, the term of this patent is extended or adjusted under 35 U.S.C. 154(b) by 0 days.

(21) Appl. No.: 10/156,664

(22) Filed: May 29, 2002

(65) Prior Publication Data

US 2003/0222064 A1 Dec. 4, 2003

(51) Int. Cl.[7] .............................................. B23K 26/06
(52) U.S. Cl. .................................................. 219/121.75
(58) Field of Search ........................ 219/121.73, 121.74, 219/121.67, 121.68, 121.69, 121.7, 121.71, 121.72, 121.75, 121.79; 225/1, 93.5

(56) References Cited

U.S. PATENT DOCUMENTS

| | | | | |
|---|---|---|---|---|
| 4,940,881 A | * | 7/1990 | Sheets | 219/121.69 |
| 5,028,967 A | | 7/1991 | Yamada et al. | |
| 5,194,711 A | * | 3/1993 | Gaukroger | 219/121.67 |
| 5,626,778 A | * | 5/1997 | Freedenberg et al. | 219/121.74 |
| 6,501,047 B1 | * | 12/2002 | Xuan et al. | 219/121.69 |

FOREIGN PATENT DOCUMENTS

| | | |
|---|---|---|
| DE | 4008383 A1 | 3/1990 |
| JP | 03210990 A | 9/1991 |

* cited by examiner

Primary Examiner—Kiley Stoner
Assistant Examiner—Jonathan Johnson
(74) Attorney, Agent, or Firm—Crowell & Moring LLP

(57) ABSTRACT

A device (1) for machining materials by means of a laser beam (2) comprises a lens arrangement (4) through which passes the light emitted by a laser source. Said lens arrangement (4) is tilted relative to the optical axis (5) and arranged eccentrically in order to change the cross-sectional area of the laser beam (2), particularly from an elliptical to a circular geometry, and at the same time to compensate an inclination angle of the laser beam passing through the lens arrangement in relation to the optical axis. This makes it possible to ensure the quality of the cut surface through essentially corresponding entry and exit cross-sectional areas of the laser beam (2) on the material, without the laser beam (2) having to be circularly polarized for this purpose. The costs for producing the device (1) can thereby be kept comparatively low.

9 Claims, 2 Drawing Sheets

APPARATUS FOR TREATING MATERIALS BY MEANS OF A LASER BEAM

Figure 1:
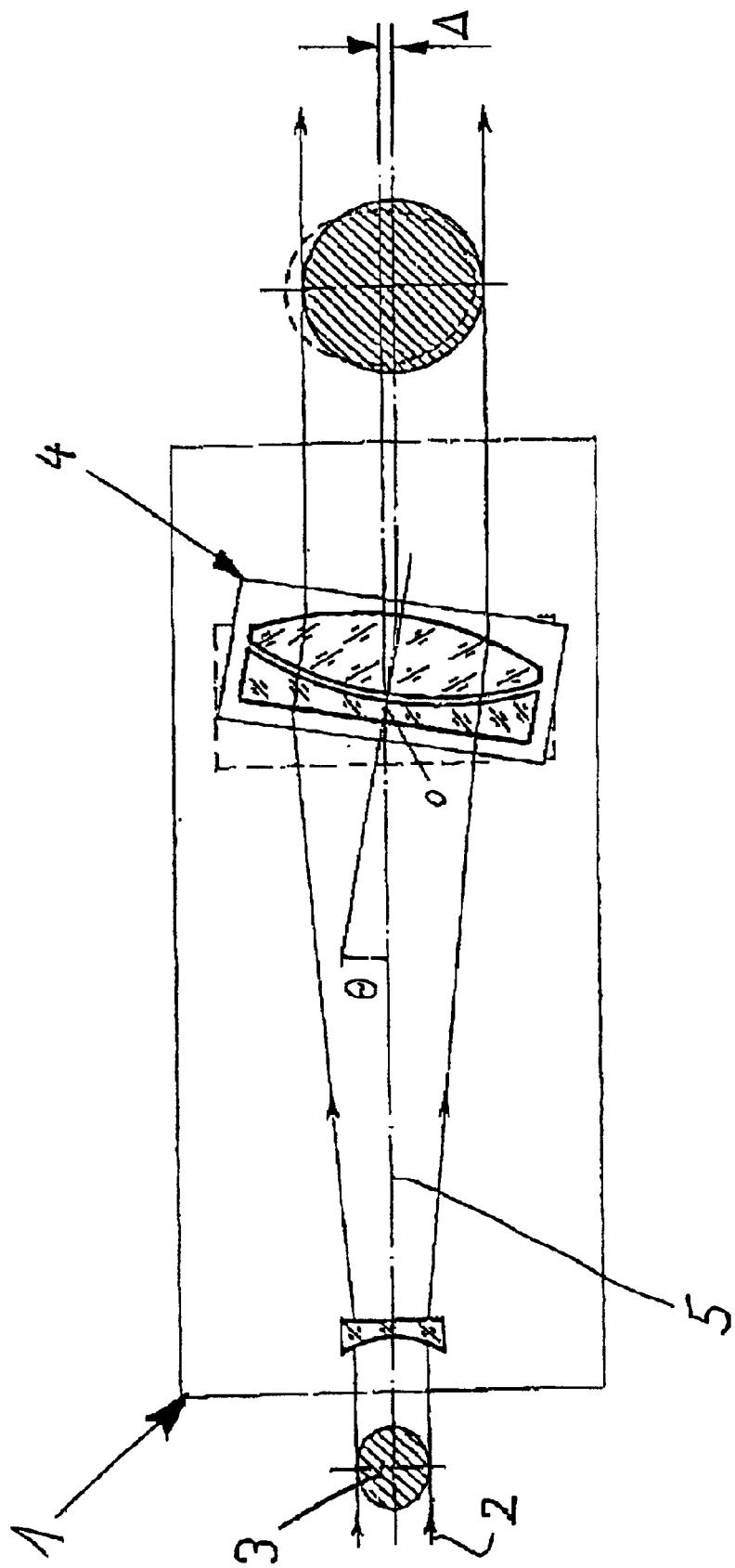

The invention relates to a device for machining materials by means of a laser beam. The light emitted by a laser is guided through at least one spherical optical element comprising a lens arrangement which is disposed in the path of the laser beam and which is tilted relative to the optical axis in order to achieve a desired geometry of a laser beam striking the surface of the material.

Such a device is known from JP 03-210 990 A, in which the light falls through a lens arrangement that is tilted relative to the optical axis and in addition can be rotated about the optical axis by means of a drive. Due to this tilted lens arrangement, a spot divergent from the optical axis is created on the surface of the material, which makes possible a circular machining area by the rotary motion.

It was found to be problematic in practice that the geometry of the entry cross-section on the surface of the component differs from the geometry of the exit cross-section on the underside of the component. This creates deviations from the set point of the cut surface, which negatively affects the quality of the component.

An essential cause for these deviations lies in the polarization of the laser light and the related degree of absorption along the edge of the cut. To avoid this drawback in practice, the polarization plane of the laser beam can be corrected corresponding to the direction of movement. This is connected with substantial control requirements, however, so that in practice, for the most part, circularly polarized laser light is used for machining in order to obtain the desired independence from the feed motion.

This circularly polarized light can be produced, for example, by using a wave plate to convert linearly polarized light. This allows only a small portion of the energy to be converted, however, because normally distributed, linearly polarized light is used for this purpose by means of an aperture of the laser in the core area of the optical axis. Only a small proportion of 20% of the energy is used. Using an aperture with a larger aperture angle initially makes available a greater portion of the energy, which is lost, however, in the conversion to circular polarization.

Another prior art solution proposes the use of a polarizer to split the non-polarized multimode radiation of the P and S polarization. However, this splitting has at the same time a negative effect on the homogenous intensity distribution of the laser light and causes energy losses, so that this proposed solution also has drawbacks in practice.

Furthermore, German Laid-Open Publication DE 40 08 383 A1 describes achromatic lens arrangements, particularly for UV rays, and their properties with regard to aberrations.

The object of the invention is to provide a means for obtaining the desired quality of the cut surface by means of the laser beam, which is essentially unaffected by the direction of motion of the laser beam. In particular, correction of the polarization corresponding to the direction of motion should be unnecessary.

According to the invention, this object is attained by a device having the features set forth in claim 1. A further embodiment of the invention is set forth in the dependent claims.

Thus, according to the invention a device is provided in which the lens arrangement is disposed eccentrically to the optical axis. This makes it possible to compensate an inclination angle of the laser beam passing through the lens arrangement in relation to the optical axis, so as to substantially simplify handling. Due to the inclined lens arrangement, the laser beam, which initially has an especially elliptical geometry, strikes the surface of the component with a substantially circular cross-sectional area, the geometry of which is approximately the same both on the surface and on the underside at its exit cross-sectional area. For this purpose, the light emitted by the laser can be used without polarization, particularly circular polarization. In contrast to the prior art devices, this makes it possible to dispense with additional mode apertures, polarizers and wave plates, so that the energy losses can be significantly reduced. The efficiency of the device can therefore be increased while the aperture and the wave plate can at the same time eliminated.

It is particularly advantageous if the lens arrangement has an achromatic lens. This prevents aberrations as the laser beam passes through the lens arrangement, so that the quality of the cut surface can be substantially enhanced.

A particularly advantageous embodiment of the invention is achieved by providing the lens arrangement with two mutually inclined optical elements. Any divergence of the laser light passing through the lens arrangement relative to the optical axis can thereby be corrected without affecting the essential and desirable characteristics of the lens arrangement. This eliminates, in particular, an otherwise required control means to adjust the direction of motion to the changed laser beam axis.

Suitable for this purpose is a particularly simple embodiment of the present invention in which the lens arrangement is disposed in an inclined plane at an azimuthal angle to the optical axis. This provides the desired eccentricity of the lens arrangement without displacement, merely by the inclination, to avoid an angled laser beam relative to the optical axis. This substantially simplifies handling when the lens arrangement is being adjusted, since only the angle of inclination needs to be adjusted.

The angle of inclination could be fixed by the manufacturer to determine the geometry of the laser beam in the focal point or in the partial beam plane. However, a particularly advantageous modification is created if the lens arrangement is movable. This allows for simple adaptation to the corresponding individual conditions of the cutting process, e.g., the thickness of the material, in order to achieve the desired result. The application range of the device can thus be significantly expanded.

For this purpose, it is particularly advantageous if the lens arrangement has an adjustable angle of inclination so that the geometry, in particular, is steplessly variable. Thus, the formation of the cutting gap can be readily adjusted to the desired dimensions and geometry. This adjustment capability makes the device very versatile.

A modification of the invention that is particularly well suited for this purpose is obtained by making the angle of inclination adjustable as a function of the direction of motion of the laser beam relative to the material. This makes it possible to adjust the geometry of the laser beam on the surface of the component so as to enhance the quality and characteristics of the cut surface. It is possible, for instance, to adjust an elliptical shape of the laser beam such that the main axis is oriented in the direction of motion of the laser beam on the material to reduce the cutting gap.

It is also particularly advantageous if the lens arrangement can be moved perpendicularly to the optical axis. This makes it possible to compensate any divergence of the laser beam from the optical axis as the beam passes through the lens arrangement and thereby to prevent any undesirable offset. This substantially facilitates the use of the device with respect to reliable control and accuracy of the cut to be made.

A particularly functional further development of the device is obtained if the lens arrangement can be azimuthally rotated about the optical axis. This rotation determines in a simple manner the position of the main axes of the possibly elliptical laser spot, irrespective of the inclination of the lens arrangement, which defines the geometry of the laser beam on the surface of the component. As a result, the laser beam can be readily corrected without changing the geometry by rotating the direction of motion of the laser beam on the material, whereby a uniform quality of the cut surface is obtained.

A particularly simple embodiment of the present invention is realized if the lens arrangement is simultaneously designed as a beam expander for expanding the laser beam. This makes it possible to obtain the lens arrangement without any additional optical components through a minor modification using only the components that are already required for the beam expander. Such a beam expander is currently used in the prior art for expanding the laser beam to reduce divergence. By combining the beam expander with the lens arrangement, the device can be realized in a small size and can be produced comparatively cost-effectively with a small number of optical components.

The invention permits a number of different embodiments. To further illustrate its basic principle, one of these embodiments is described in greater detail with reference to the drawing in which FIG. 1 is a schematic side view of the device according to the invention, FIG. 2 is a front view of a lens arrangement of the device shown in FIG. 1, and FIG. 3 is a sectional side view of the lens arrangement.

FIG. 1 shows the inventive device 1 for machining materials (not depicted). Laser beam 2, which is emitted by a laser source (not depicted) and which has an elliptical cross-sectional area, initially strikes a plano-convex lens 3, which widens the beam path. This reduces the divergence of laser beam 2. Laser beam 2 then passes through a lens arrangement 4, particularly an achromatic lens. This lens arrangement 4 is tilted by an inclination angle θ relative to an optical axis 5. This gives laser beam 2 a substantially circular cross-sectional area, which essentially does not diverge as the beam passes through the material, so that a desired cut surface is obtained. Lens arrangement 4 is at the same time displaced eccentrically to optical axis 5, such that the exiting beam is offset only by an amount A, but does not extend at an angle to optical axis 5. As a consequence, the control requirement for device 1 is comparatively low.

Figures 2, 3:
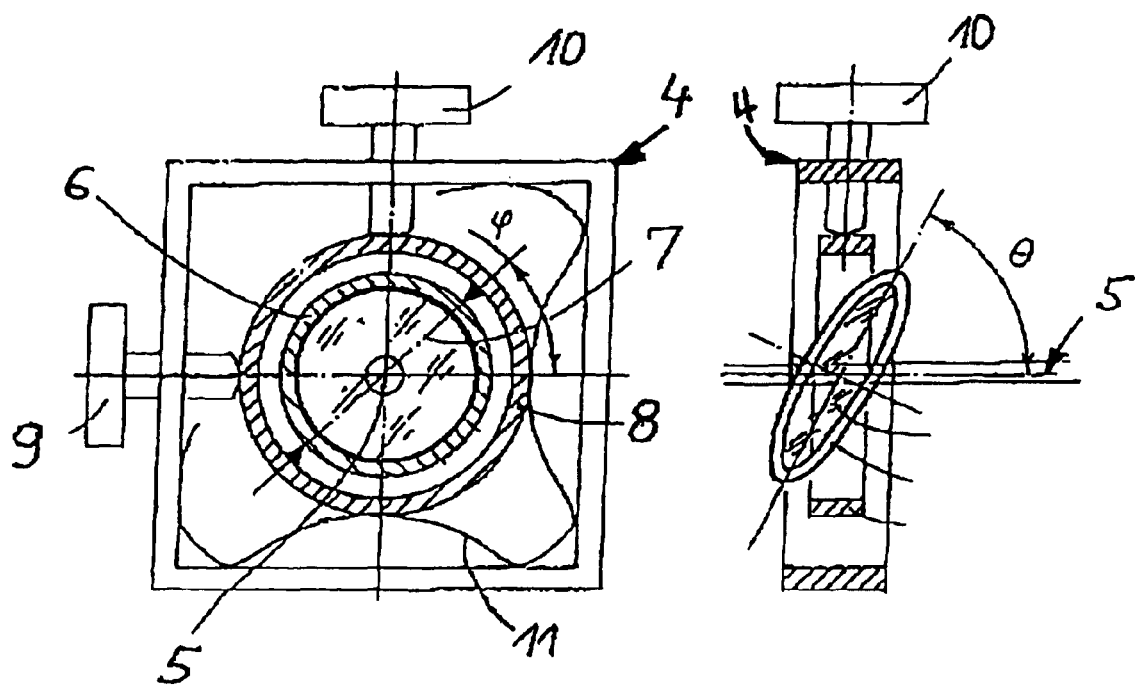

The exact configuration of lens arrangement 4 is further illustrated in FIGS. 2 and 3, which show an enlarged partially cut-away front view and a side view of lens arrangement 4. To adjust its angular position relative to optical axis 5, lens arrangement 4 is held in an inner ring 6 that can be rotated about an axis 7 relative to optical axis 5. This inner ring 6 with its axis 7 is mounted in an outer ring 8. Said outer ring 8 is mounted so as to be azimuthally rotatable in the X and Y direction by means of two adjustable or displaceable setting screws 9 and 10 and a clamping spring 11. For the basic setting, the outer ring 8 can be adjusted in the X and Y direction by means of setting screws 9, 10. As a result, lens arrangement 2 is steplessly adjustable in the X and Y direction with respect to its tilt as well as its position and is rotatable, so that it can be adjusted to obtain laser beam characteristics that are optimal for the corresponding application.

What is claimed is:

1. Device for machining materials by way of a laser beam, in which light emitted by a laser is guided through at least one spherical optical element comprising a lens arrangement, which is arranged in the beam path of the laser beam and which is tilted relative to the optical axis to obtain a desired geometry of a laser beam striking the surface of the material, wherein the lens arrangement is disposed eccentrically to the optical axis and has two optical elements that are tilted toward one another.

2. Device as claimed in claim 1, wherein the lens arrangement has an achromatic lens.

3. Device as claimed in claim 1, wherein the lens arrangement is disposed in an inclined plane having an azimuthal angle (φ) relative to the optical axis.

4. Device as claimed in claim 1, wherein the lens arrangement is movable.

5. Device as claimed in claim 4, wherein the lens arrangement has an adjustable angle of inclination (θ).

6. Device as claimed in claim 5, wherein the angle of inclination (θ) is adjustable relative to the material as a function of the direction of motion of the laser beam.

7. Device as claimed in claim 4, wherein the lens arrangement can be moved perpendicularly to the optical axis.

8. Device as claimed in claim 4, wherein the lens arrangement can be azimuthally rotated about the optical axis.

9. Device as claimed in claim 1, wherein the lens arrangement is simultaneously designed as a beam expander for expanding the laser beam.

* * * * *